United States Patent
Sanchez et al.

(10) Patent No.: US 11,718,180 B2
(45) Date of Patent: Aug. 8, 2023

(54) BRAKE CONTROLLER INTERFACE

(71) Applicant: Curt Manufacturing, LLC, Eau Claire, WI (US)

(72) Inventors: Joecyl Sanchez, Walled Lake, MI (US); Harsh Desai, Taylor, MI (US); Robert Lange, III, White Lake, MI (US); Praveen Reddy Muddasani, Novi, MI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 130 days.

(21) Appl. No.: 17/217,506

(22) Filed: Mar. 30, 2021

(65) Prior Publication Data

US 2021/0309108 A1     Oct. 7, 2021

Related U.S. Application Data

(63) Continuation-in-part of application No. 16/057,351, filed on Aug. 7, 2018, now Pat. No. 10,960,860.

(60) Provisional application No. 62/541,947, filed on Aug. 7, 2017.

(51) Int. Cl.
    *B60T 7/20*     (2006.01)
    *B60K 37/06*     (2006.01)
    *B60T 7/04*     (2006.01)

(52) U.S. Cl.
CPC .............. *B60K 37/06* (2013.01); *B60T 7/042* (2013.01); *B60T 7/20* (2013.01); *B60K 2370/126* (2019.05); *B60K 2370/152* (2019.05); *B60K 2370/172* (2019.05); *B60K 2370/341* (2019.05)

(58) Field of Classification Search
CPC ........ H01H 9/56; H01H 19/025; H01H 19/14; H01H 19/56; B60T 7/085; B60T 7/16; B60T 7/20; B60T 17/22; G09F 9/30
USPC ........ 200/4, 11 R, 14; 303/3, 7, 15, 20, 123; 701/70, 78; 340/453, 459
See application file for complete search history.

(56) References Cited

U.S. PATENT DOCUMENTS

| | | | |
|---|---|---|---|
| 3,497,266 | A | 2/1970 | Umpleby |
| 3,909,075 | A | 9/1975 | Pittet, Jr. et al. |
| 3,967,863 | A | 7/1976 | Tomecek |
| 4,295,687 | A | 10/1981 | Becker et al. |
| | | | (Continued) |

OTHER PUBLICATIONS

Bourns Pro Audio, PEC11L Series—11 mm Low Profile Encoder, Feb. 2017, downloaded from internet.
(Continued)

*Primary Examiner* — Christopher P Schwartz
(74) *Attorney, Agent, or Firm* — Shewchuk IP Services, LLC; Jeffrey D. Shewchuk

(57) ABSTRACT

A brake controller has a control dial with a series of full color LEDs arranged around the dial. The dial with its LEDs is in a module mounted on the dash of the towing vehicle and connected by a cable to a main module mounted out of sight. The dial is a rotary encoder pushbutton mounted on the same circuit board as the LED chips. Status information is output using the LEDs primarily based on color. Substantially all setting input is provided solely by user manipulation of the dial, pushing the dial in to change setting input mode, with the value of the input reflected in the number of LEDs being lit in a color corresponding to the brake controller setting being changed, as the user rotates the dial either clockwise or counterclockwise to change setting values.

19 Claims, 7 Drawing Sheets

(56) References Cited

U.S. PATENT DOCUMENTS

| | | | |
|---|---|---|---|
| 4,398,252 A | 8/1983 | Frait | |
| 4,599,605 A | 7/1986 | Froeb et al. | |
| 4,721,344 A | 1/1988 | Frait et al. | |
| 4,856,850 A | 8/1989 | Aichele et al. | |
| 4,866,219 A | 9/1989 | Riding et al. | |
| 5,149,176 A | 9/1992 | Eccleston | |
| 5,282,641 A | 2/1994 | McLaughlin | |
| 5,615,930 A | 4/1997 | McGrath et al. | |
| 5,620,236 A | 4/1997 | McGrath et al. | |
| 5,741,048 A | 4/1998 | Eccleston | |
| 6,012,780 A | 1/2000 | Duvernay | |
| 6,068,352 A | 5/2000 | Kulkarni et al. | |
| 6,462,677 B1 | 10/2002 | Johnson et al. | |
| 6,615,125 B2 * | 9/2003 | Eccleston | B60T 7/20 |
| | | | 303/7 |
| 7,021,723 B1 | 4/2006 | Kaufman | |
| 7,058,499 B2 | 6/2006 | Kissel | |
| 8,463,519 B2 | 6/2013 | McCann | |
| 9,150,201 B2 | 10/2015 | Smith et al. | |
| 9,315,173 B1 | 4/2016 | Gray et al. | |
| 9,446,747 B2 | 9/2016 | Fosdike | |
| 9,738,125 B1 | 8/2017 | Brickley et al. | |
| 10,509,480 B2 | 12/2019 | Mega | |
| 10,960,860 B2 * | 3/2021 | Sanchez | B60T 8/1708 |
| 2005/0127747 A1 | 6/2005 | Robertson | |
| 2006/0214506 A1 | 9/2006 | Albright et al. | |
| 2007/0063581 A1 | 3/2007 | Teifke et al. | |
| 2007/0241874 A1 | 10/2007 | Okpysh et al. | |
| 2008/0224640 A1 | 9/2008 | Itoh et al. | |
| 2008/0257701 A1 | 10/2008 | Wlotzka | |
| 2010/0152920 A1 | 6/2010 | McCann | |
| 2010/0152989 A1 | 6/2010 | Smith et al. | |
| 2010/0222979 A1 | 9/2010 | Culbert et al. | |
| 2015/0232075 A1 * | 8/2015 | Fosdike | B60T 7/20 |
| | | | 701/70 |
| 2017/0162347 A1 | 6/2017 | Harazawa et al. | |
| 2017/0190283 A1 | 7/2017 | Ding | |
| 2019/0039578 A1 | 2/2019 | Sanchez et al. | |
| 2019/0341635 A1 * | 11/2019 | Kulkarni | B60T 17/18 |
| 2020/0039354 A1 | 2/2020 | Kulkarni et al. | |
| 2022/0105913 A1 * | 4/2022 | Fosdike | B60T 7/20 |
| 2022/0379853 A1 * | 12/2022 | Goodarzi | B60T 13/662 |
| 2022/0402468 A1 * | 12/2022 | Kulkarni | B60T 8/1708 |

OTHER PUBLICATIONS www.szledcolor.com, WS2812B—Mini Intelligent External Control LED LED Color, downloaded from internet.

Redarc Electronics Pty Ltd., The Power of Redarc TowPro Elite Trailer Brake Controller, 2015, downloaded from internet.

* cited by examiner

INDICATORS

Calibration
(repeated green ramp-up)

Overloaded
(flashing red yellow)

Miswired
(Red)

Disconnected
(flashing blue)

Accelerometer error
(purple ramp-up)

MODES

Manual
(red)

Brightness
(white)

Output
(green - red)

Sensitivity
(blue - red)

BRAKE CONTROLLER INTERFACE

CROSS-REFERENCE TO RELATED APPLICATION(S)

The present application is a continuation-in-part of U.S. patent application Ser. No. 16/057,351 entitled BRAKE CONTROLLER INTERFACE filed Aug. 7, 2018, which claims priority from U.S. Provisional Application No. 62/541,947 entitled BRAKE CONTROLLER INTERFACE filed Aug. 7, 2017, both incorporated herein by reference.

BACKGROUND OF THE INVENTION

The present invention relates to brake controllers used in towing, and particularly to the interface on the exterior of a housing, such as for mounting relative to a dashboard on a towing vehicle, to communicate information to and from the brake controller.

Brake controllers are devices used in towing a trailer, towed vehicle or similar load having brakes behind a towing vehicle. The brake controllers use various strategies and components to activate the trailer brakes at an appropriate rate and time relative to the driver's control of brakes on the towing vehicle. Exemplary brake controllers are disclosed in U.S. Pat. Nos. 6,012,780, 6,068,352, 7,058,499, 8,463,519, 9,150,201, 9,315,173 and 9,446,747 and U.S. Pat. Pub. No. 2010/0152920, each incorporated by reference.

Some brake controllers include a display and all control buttons on a single package or housing that contains all of the integrated circuit control electronics. Other brake controllers, such as disclosed in U.S. Pat. No. 9,150,201, separate the display and/or control buttons on a housing which is different from the housing containing the integrated circuit control electronics. In both types of configurations as presently on the brake controller market, the display (to communicate from the unit to the person operating the vehicle) typically includes one or two seven-segment units, and perhaps a plurality of LEDs or other lights. At the same time, the control buttons (for the person operating the vehicle to input settings into the brake controller) can include one or more push buttons, slider controls, and one or more dials. Generally speaking, both the display and the control buttons of prior art brake controllers are not intuitive or easy to understand. A numerical display is often used to communicate brake controller setting values. If LEDs or other lights are used, they are generally not associated with the position of the controls or the settings of the brake controller, but instead are used to communicate connection status and/or error messages. Better interfaces with brake controllers are needed.

SUMMARY OF THE INVENTION

The present invention is a brake controller in which a control dial or button is provided with lights or similar controllable indicators around the dial or button to provide feedback to the user regarding the operational input to the brake controller. In one preferred embodiment, the dial can be a rotary dial which allows continuous rotation, with ten full color Red-Green-Blue (RGB) light emitting diodes (LEDs) arranged in an arc around the dial. The dial with its LEDs can be provided as a small assembled package to be mounted as a single unit in a location readily accessible to the driver, such as on the dashboard of the towing vehicle. In another preferred low cost embodiment, the dashboard-mounted small assembled package can include a single push button, with a series of single color LEDs. Meanwhile, the preferred embodiments include a separate electronics unit that communicates with the input dial or push button but can be mounted in a different location, such as under the dashboard of the towing vehicle. With a minimal change to the dashboard of the towing vehicle including adding only the small dial or push button with LEDs, the user interface provided by the present invention can communicate more simply and intuitively with the driver, both for input from the driver and feedback to the driver regarding the brake controller settings and indicators. At the same time, the brake controller as a whole has lower component costs as compared to prior art brake controllers with the same electronic capabilities.

BRIEF DESCRIPTION OF THE DRAWINGS

The present invention is described with reference to the attached drawing sheets, in which.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
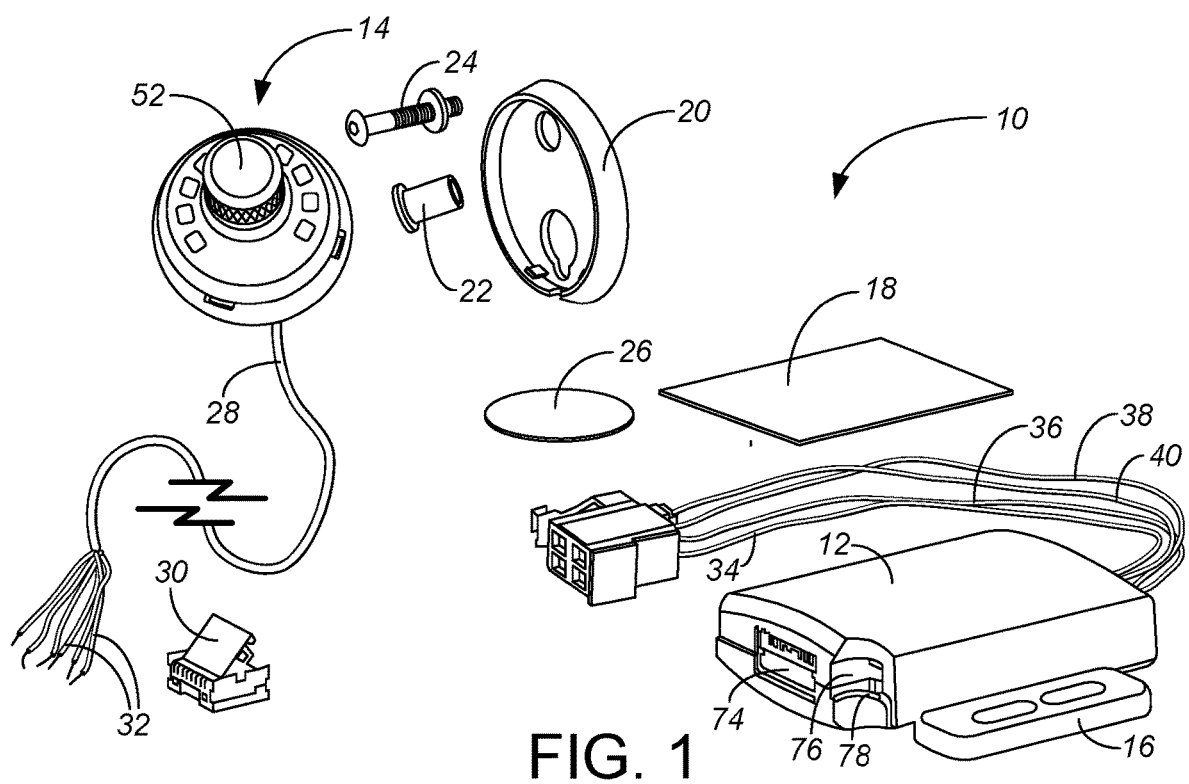
FIG. 1 is a perspective view of the primary components that make up a first preferred brake controller of the present invention.

As shown in FIG. 1, the brake controller 10 of one preferred embodiment includes a main module 12 and a display/knob module 14, as well as various components to make installation and assembly of the main module 12 and the display/knob module 14 easier. Another preferred embodiment replaces the display/knob module 14 with a display/push button module 15 shown in FIG. 7. In the preferred embodiments, the logic implementation of the brake controller 10 occurs within the main module 12, while the display/knob module 14 or display/push button module 15 provides the substantially entire interface between the brake controller 10 and the user, communicating inputs from the user to the brake controller 10 and communicating information back to the user.

The most preferred embodiment includes two alternative ways of mounting the main module 12, either using a mounting flange 16 and/or using a main module adhesive pad 18. The most preferred embodiment also includes two alternative ways of mounting the display/knob module 14, including a base plate 20, well nut 22 and screw 24 and/or a display/knob adhesive pad 26. Use of the base plate 20 in mounting the display/knob module 14 to the dash board (not shown) or instrument panel (not shown) of a towing vehicle (not shown) better allows the cable 28 for the display/knob module 14 to be inserted through a hole drilled in the dash board or instrument panel. After this cable 28 is routed as desired, a plug 30 connected is attached to the wires 32 on the end of the cable 28 so these wires 32 can be plugged into and communicate with the main module 12.

The main module 12 communicates with the towing vehicle and the trailer or towed vehicle (not shown) as well known in the prior art, which could include wireless communications but more preferably includes a four wire connection 34, 36, 38, 40. As shown in the wiring diagram of FIG. 4, two of the wires are used as power wires 34, 36 from the towing vehicle's power system, typically a nominal 12 volt direct current system using an automotive battery 42. A fuse or circuit breaker 44 (preferably 30 Amp) may be added or included as part of the power connection. Using coloring typical of vehicle power systems and brake controllers, the "hot" power wire 34 is preferably black and the neutral or ground power wire 36 is preferably white. Alternatively, a different power source could be used to make wiring and installation easier, such as from a replaceable or rechargeable battery (not shown) in the main module 12. However, the main module 12 is made simpler and more reliable by omitting a separate power source and avoiding any need to replace or recharge that separate power source or otherwise access the main module 12 during use of the brake controller 10. A third wire 38, preferably colored red, taps into the brake light signal, activating the brake controller 10 whenever the driver steps on the brake pedal 46 of the towing vehicle. The fourth wire 40, preferably colored blue, provides the output of the brake controller 10, a signal indicative of braking power to be applied to the towed trailer or towed vehicle brakes. For instance, the blue output signal wire 40 may be routed to a trailer connector 48, to be plugged in to the plug (not shown) of the control and power wiring of the trailer as widely known in the towing art. A universal pigtail harness 50 or similar extension wires may be used for making the wiring connections.

As known in the brake controller art, the main module 12 includes circuitry to determine the braking power output. In general, the application and timing of braking force to the trailer as determined within the main module 12, based on operation of the towing vehicle brake pedal 46 in conjunction with the sensor(s) and settings of the main module 12, is within the prior art. In the preferred embodiment, in addition to the brake light signal input 38, the main module 12 houses an inertial sensor (not separately shown), such as a digital three-axis accelerometer, with the most preferred embodiment employing a ADXL345 three-axis accelerometer chip available from Analog Devices of Norwood, Mass. A microcontroller (not separately shown) in the main module 12 preferably controls the operation of the brake controller 10, such as a LPC1111/12/13/14 32 bit microcontroller chip from NXP Semiconductor of Eindhoven, Netherlands. When the brake pedal 46 is pressed, the main module 12 combines readings from the three-axis accelerometer with settings input through the knob 52 or push button 53 to electrically output a value on the blue output signal line 40 which controls how hard and fast the trailer brakes are activated.

The display/knob module 14 or display/push button module 15 communicates with the main module 12. In the preferred embodiments, this communication occurs through a cable 28 that includes six separate wires 32a-f, though in other embodiments the communication could occur wirelessly or with a different number of wires. For reasons similar to the main module 12, two of the six wires 32 connecting the main module 12 to the display/knob module 14 or to the display/push button module 15 are power wires, including a hot wire 32a and a ground wire 32b. For convenience of circuitry and components, the preferred power system for the display/knob module 14 or for the display/push button module 15 is a 5 V DC system. The main module 12 includes electronic power component circuitry (not separately shown) to derive a smooth, stable 5 V DC power for the display/knob module 14 or display/push button module 15. The other four wires 32c-f in the preferred connection between the display/knob module 14 or display/push button module 15 and the main module 12 are data wires, three wires 32c-e providing input data to the main module 12 and one wire 32f providing output data from the main module 12 for display to the user.

The primary reason for separating the main module 12 and the display/knob module 14 or display/push button module 15 is to make the module 14/15 smaller and more readily mounted in the vehicle. The module 14/15 should be mounted in a location where it is easily reached, such as by the driver of the vehicle while driving, and can be easily seen at a glance without obstructing the view of the driver on the road or causing the driver to turn significantly away from the road. As power supplies, accelerometers, microcontrollers and other components become smaller, alternative embodiments may combine the main module electronics into the display/knob module 14 or display/push button module 15. In the current most preferred embodiments, the main module 12 can be securely mounted at virtually any location in the towing vehicle, such as under the dash, without banging the driver's knees but while still allowing relatively short wiring runs both to the vehicle battery 42 or fuse box, to the towing vehicle brake light circuit, to the display/knob module 14 or to the display/push button module 15, and to the trailer plug 48.

Figure 3:
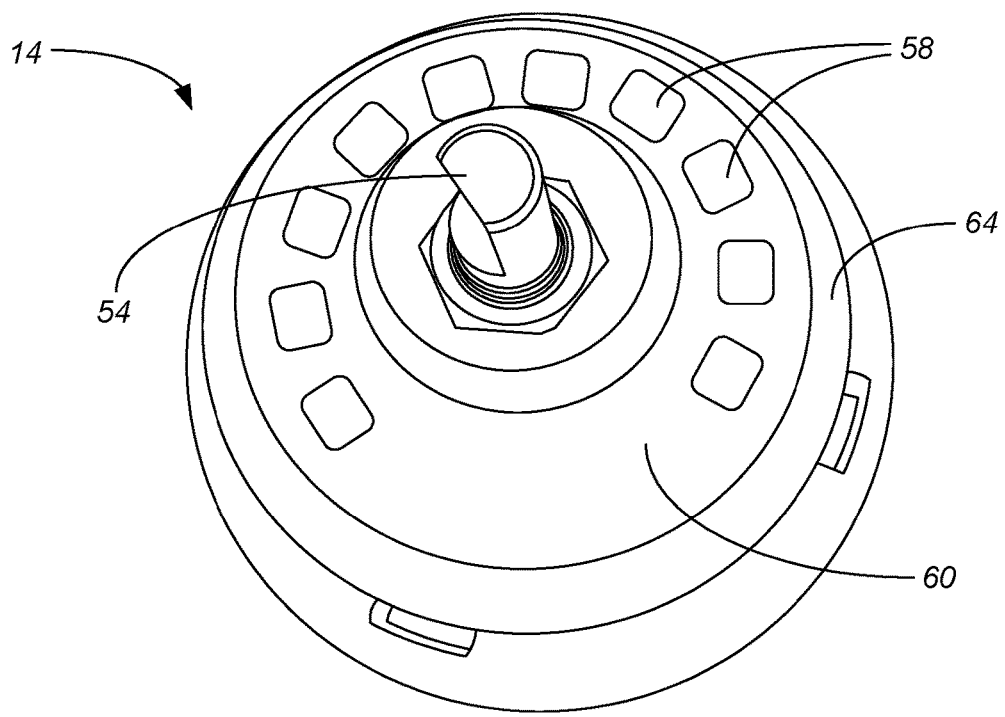
FIG. 3 is an enlarged view of the interface module of FIG. 2.
Figure 2:
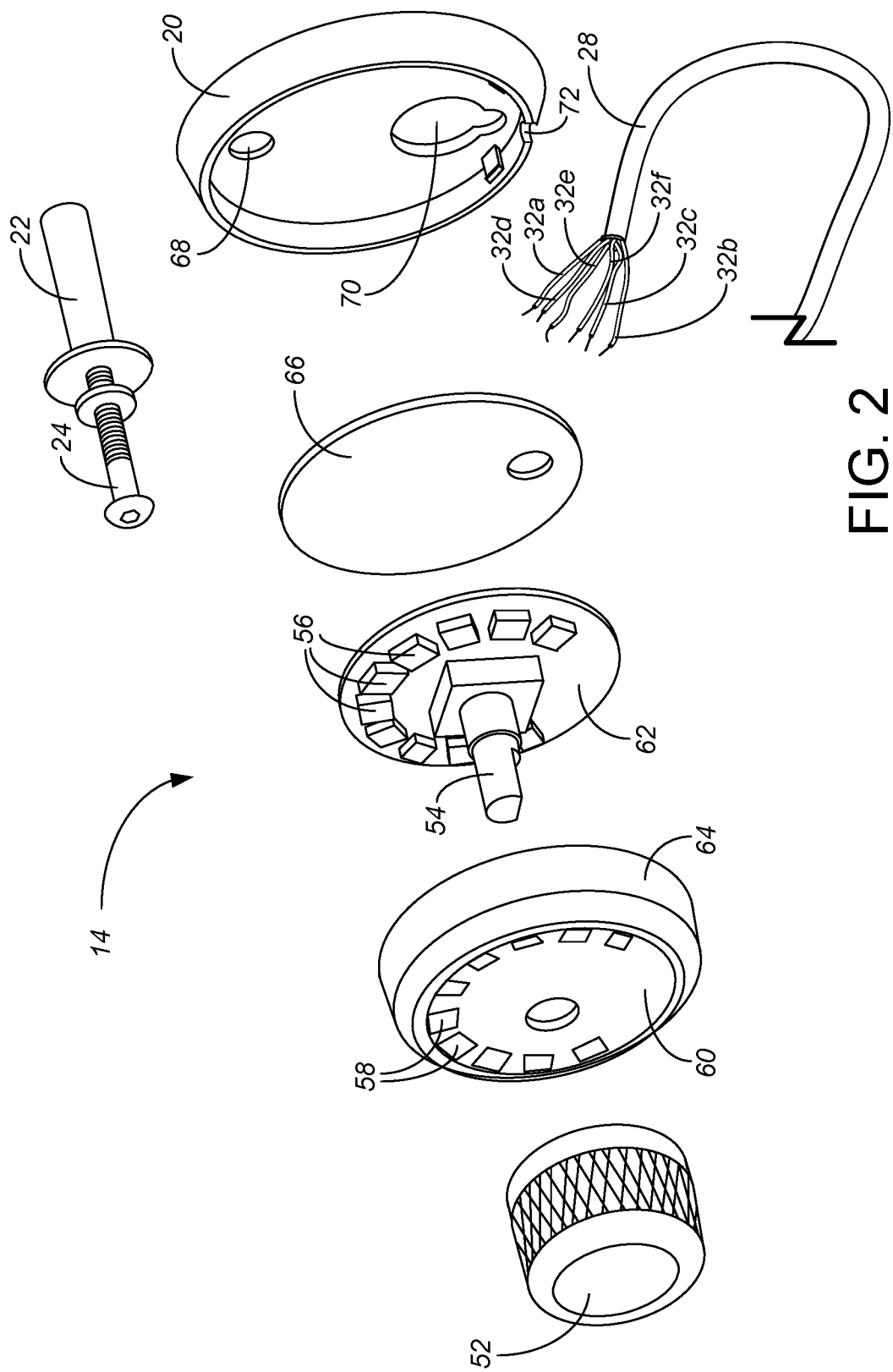
FIG. 2 is an exploded perspective view of the preferred interface of FIG. 1.

The display/knob module 14 of the present invention is best seen in FIGS. 1-3. Instead of having the myriad of different buttons, knobs, sliders, input screens or other controls of prior art brake controllers, the present invention uses a single knob 52 that allows a user to input substantially all the input information to the brake controller 10 which is needed for ordinary operation of the brake controller 10. This knob 52 permits two separate input movements, either pressing the knob 52 axially inward to overcome its spring force and act as a pushbutton, or rotating the knob 52 clockwise or counterclockwise. Both of these types of inputs, pushing the knob 52 in and rotating the knob 52, are inherently understood by users; many radio sound systems in today's motor vehicles utilize the identical types of controls, such as pushing a knob in to turn the radio on or off, and rotating the knob to increase or decrease radio volume. As will be explained in more detail, the fact that the single knob 52 allows two very distinct and separate movements to allow distinct and separate input commands is important, not only toward increasing the amount and type of information that can be readily input, but as providing a safety factor that information will not be inadvertently entered.

Figure 5:
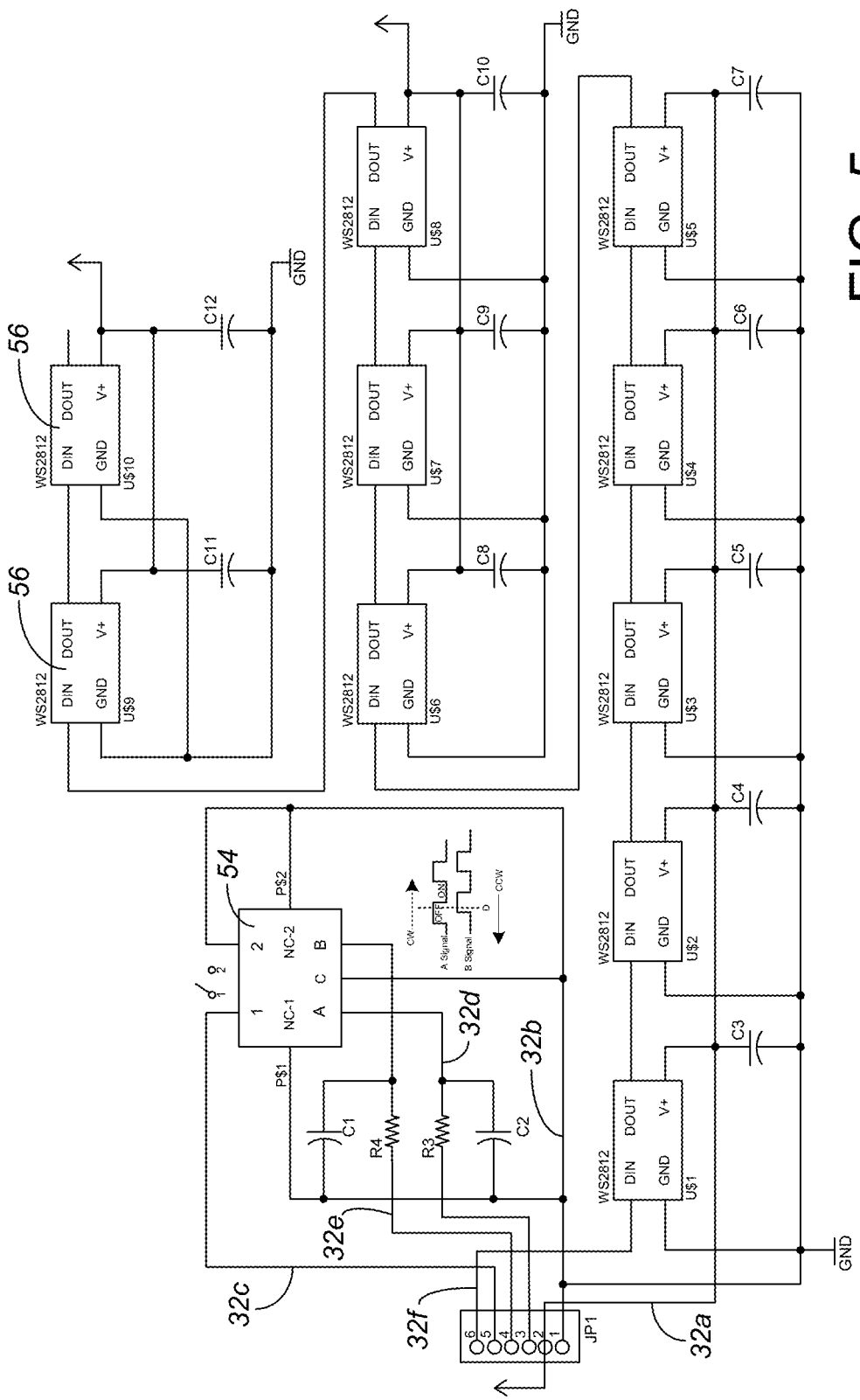
FIG. 5 is a schematic view of the electronics within the interface module.

The most preferred knob input is a combination rotary encoder/pushbutton 54. Examples of such devices are explained in U.S. Pat. Nos. 4,599,605, 4,866,219 and 6,462, 677, all incorporated by reference. One of the data wires 32c combines, opposite either the power input or the ground, to act as a switch across pins 1 and 2 as schematically represented in FIG. 5. When the knob 52 is pushed in, pins 1 and 2 are closed; otherwise pins 1 and 2 are open. By correctly wiring this to the microcontroller in the main module 12, the main module 12 knows whenever the knob 52 is pushed.

Two 32*d*, 32*e* of the data wires 32 output a two bit quadrature code on pins A and B, allowing four unique values schematically represented in FIG. 5. Rotation of the knob 52 clockwise proceeds through one sequence, while rotation of the knob 52 counter-clockwise proceeds through the opposite sequence. Thus, correct wiring the output of pins A and B to the micro-controller allows the main module 12 to know whether the knob 52 is being rotated clockwise and its general speed of rotation, or whether the knob 52 is being rotated counterclockwise and its general speed of rotation, or whether the knob 52 is not being rotated.

In the most preferred embodiment, the knob input is provided by a PEC11L series low profile encoder 54 available from Bourns Pro Audio of Riverside, Calif. Rotationally, it has a shaft with soft detents every 18° of rotation, There are no stops and no reason why the dial cannot be rotated endlessly either clockwise or counter-clockwise. It has a maximum operational speed of 60 RPM and a maximum contact bounce at 60 RPM of 10 ms, with the quadrature code outputting 15 pukes per 360° of rotation. As a pushbutton, it has a push travel distance about 0.5 mm and a required push actuation force of about 600 gf, and requires a few milliseconds to debounce (such as 4 ms at make and 10 ms at break). Resistors R3 and R4 (10 kΩ) and capacitors C1 and C2 (0.1 µF) are included within the display/knob module 14 on the rotary data lines 32*d*, 32*e* as shown in FIG. 5.

Unlike many prior art microprocessor-based brake controllers, there is no display screen to output numbers or letters to be read and translated into meaning by the user. Instead, the output communicated to the user is entirely through a series of multi-color lights 56, situated around the dial input in a way that makes intuitive sense. The preferred display/knob module 14 includes ten such lights 56, mounted so as each to be viewable through its own translucent light-diffusing window 58. Other embodiments include a different number of lights or different types of lights, provided there are enough lights to be interpreted by the user as a series indicating movement of the input along a range.

With the input being a knob 52, the lights 56 are mounted in a circumferential series, extending about 2400 around the shaft axis. The about 120° gap 60 in the circumference is preferably below the knob 52 as mounted in the towing vehicle. In the most preferred embodiment, the lights 56 are provided by are WS2812B-Mini intelligent external control LED chips commercially available from Shenzhen LED Color Opto Electronic Co. Ltd. of Shenzhen, China. Each of these LED chips 56 has a quite small footprint, square with dimensions of about 3.5×3.5 mm, allowing them to be positioned next to each other close in to the dial 52. For instance, the preferred knob 52 has a knurled outer surface diameter of about 20 mm, with the ten LED chips 56 placed around the dial 52 to define an arc with a diameter of only about 30 mm. As best shown in FIG. 2, even though each LED chip 56 is individually just about a square, the LED chips 56 are mounted angularly offset from each other, in a circular arc rather than a rectangular pattern. Each preferred LED chip 56 actually includes three separate LEDs (not separately shown), one red, one green and one blue, additive to produce a broad array of colors and intensity. The three primary colors of each chip 56 can achieve 256 level grayscale. Preferably each window 58 only covers and provides visibility over the portion of the LED chip 56 that contains the three additive LEDs. Particularly with window coverage over the LEDs, the user perceives the three monocolor LEDs as a single light of selectable color and intensity.

In the preferred embodiment, the series of LED chips 56 are wired in a cascade as shown in FIG. 5, with each chip 56 having its power-in supported by a capacitor C3-C12 (0.1 µF). The data transfer protocol of the preferred LED chips 56 uses a single NZR communication mode, allowing each chip 56 in the series to collect initial 24 bit data through its data in port and then reshape the 24 bit data sent to the next chip 56 in the cascade through its data out port. Other methods of cascading the lights 56 could be used, including allowing the microprocessor to individually control each light 56 rather than output a single 24 bit data stream that controls all the lights 56. The important concept is that the multiple lights 56 act collectively rather than individually to communicate information to the user. The preferred logic scheme utilizes both which colors are used and which lights are lit to convey different information to the user.

In the first preferred embodiment, both the knob 52 and the LEDs 56 are mounted, together with the other electronic components of FIG. 5, on a single circuit board 62 as shown in FIG. 2. The cable 28 for the display/knob module 14 includes six wires 32 electrically connected as known in the art (such as by soldering) to the circuit board 62. After the electrical components are mounted on the circuit board 62 and the cable wires 32*a-f* are connected to the circuit board 62, the circuit board 62 is preferably sealed within the housing front 64 and the housing back 66 as part of the manufacturing process for the brake controller 10, i.e., the user is not permitted access to the circuit board 62 shown in FIG. 2. The housing front 64 and the housing back 66 protect the electrical components and the entire circuit of FIG. 5 from moisture, dirt and human/exterior object contact, and the preferred display/knob module 14 is amply robust for its environment of use in the cab of the towing vehicle.

This series of lights 54 of the preferred display/knob module 14 intuitively provides a number of advantages. Firstly, in most mounting locations and dashboard orientations, the knob 52 will be mounted so as to be directed lower than the line of sight of the driver. Having the gap 60 below the knob 52 places the lights in a position where they will be least likely to be obstructed by the existence of the knob 52, and the least likely to be obstructed when the user reaches with his or her hand and arm to turn the knob 52. Secondly, the gap 60 presents a logical beginning and end for the data/information being conveyed. The user inherently expects that the first light in the series—mirroring low volume on the car stereo—is to the far left, and the last light in the series—mirroring high volume on the car stereo—is to the far right. Thirdly, the arc of lights 56 clearly indicates and reflects the rotational motion of the knob 52, intuitively indicating to the user that the knob 52 should be turned clockwise or counterclockwise to control the lights 56 and to control the brake controller 10. In an alternative embodiment where the control is a slider rather than a rotational knob 52, the lights should be linearly arranged relative to the slider so as to intuitively indicate that the slider should be slid in a direction to control the lights and to likewise control the brake controller 10 with more or less power.

The preferred installation method for the present invention involves mounting the LED display rotary knob module 14 before mounting the main module 12. The LED display rotary knob module 14 is preferably mounted in a suitable location where it is securely attached to a solid surface which can be easily reached by the driver of the vehicle, such as in the dashboard of the vehicle adjacent the radio controls, adjacent the HVAC controls, adjacent the lighting controls, or adjacent the instrument panel. If drilling is to occur for either a mounting screw 24 or for the cable 28 to extend through the dashboard, the area behind the mounting location must be clear to avoid damage while drilling. The installer holds the base plate 20 in the selected position, and marks two hole locations through the base plate 20, and then drills two holes through the dash panel at the marked locations. The installer inserts the well nut 22 into the outer hole 68 of the base plate 20, securing the base plate 20 with the screw 24 to the dash panel. Once the base plate 20 is secured to the dash panel, the installer feeds the cable 28 of the LED display rotary knob module 14 through the center hole 70, and then positions the LED display rotary knob module 14 into the base plate 20 with the LEDs 56 in the upright position, pressing down until it clicks past detents in peripheral prongs of the base plate 20. After the LED display rotary knob module 14 is in place, the installer attaches the plug connector terminal 30 to the end of the cable wires 32, and routes the cable 28 toward the main module location.

As an alternative to drilling through the dash panel, the LED display knob module 14 can be mounted to the dashboard in the vehicle using the circular adhesive pad 26. Either the back of the module 14 or more preferably the back of the base plate 20 is adhered to the dash panel. When the back of the base plate 20 is adhered to the dash panel, the cable 28 can be routed downward out a gap 72 in the base plate 20 and in front of the dash panel toward the main module location.

Like the LED display rotary knob module 14, the main module 12 must be mounted securely to a solid surface of the towing vehicle. But unlike the LED display rotary knob module 14, the main module 12 does not need to be within sight lines and reach of the driver. Instead, the main module 12 is preferably mounted by tightening screws through openings in the mounting flange 16 into a mounting location, such as the kick plate or console side surfaces around the driver's feet or legs or the bottom or back of the dash panel. As an alternative to using screws and the mounting flange 16, the main module 12 may be adhesively mounted using the rectangular adhesive pad 18, and/or may be securely tied in place using zip ties (not shown). Once the wiring distance between the main module 12 and the display/knob module 14 is established and the cable 28 is run, the cable 28 can be cut to length with the installer installing the plug 30 on the end of the six wires 32*a-f* of the cable 28. Then the installer inserts the plug connector 30 of the cable 28 into the mating receptor plug 74 of the main module 12.

Figure 4:
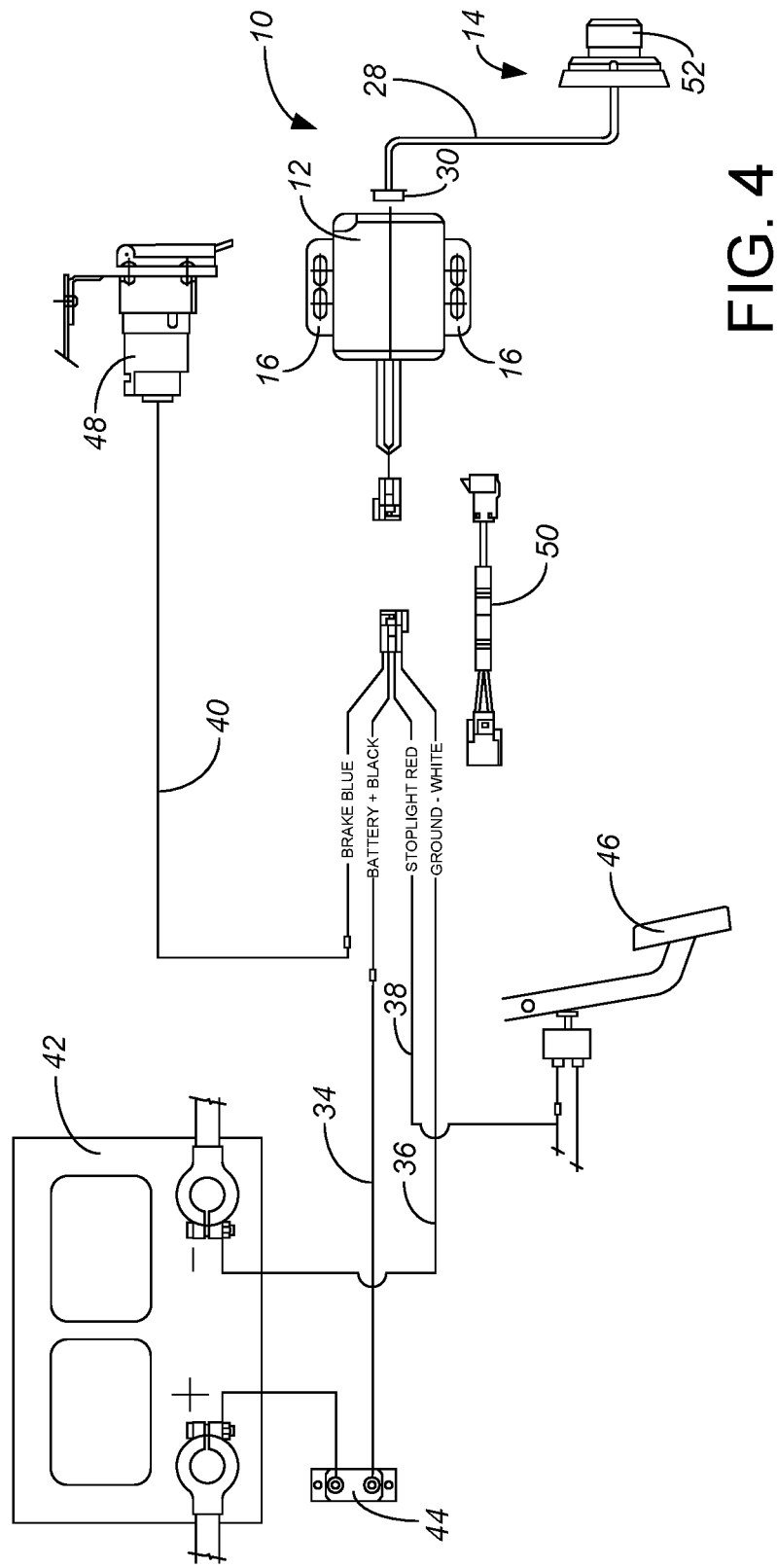
FIG. 4 is a schematic view showing wiring of the brake controller of the present invention in a towing vehicle.

The main module 12 is wired into the towing vehicle as shown in FIG. 4, providing power 34, 36 to the brake controller 10, providing the brake light signal 38 to the brake controller 10, and providing the brake control output signal 40 to the towed vehicle or trailer brakes. If desired, the main module 12 can be plugged in to the pigtail harness or vehicle-specific quick plug 50. If such a harness or plug 50 is unavailable, hard wiring may be necessary.

Figure 6:
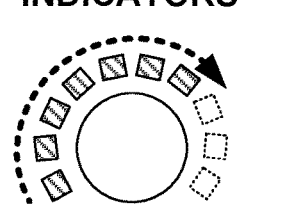
FIG. 6 is a schematic view indicating the preferred display communication of the present invention.
Figure 6:
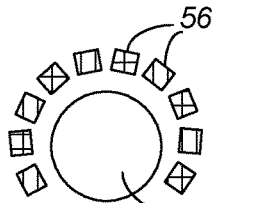
Figure 6:
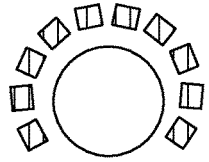
Figure 6:
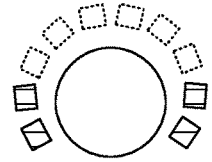
Figure 6:
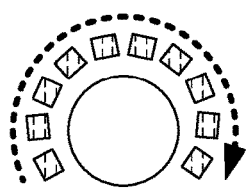
Figure 6:
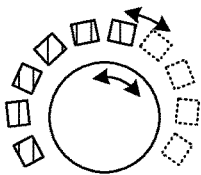
Figure 6:
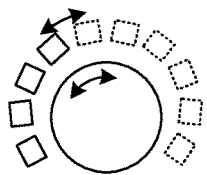
Figure 6:
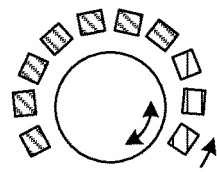
Figure 6:
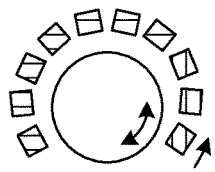

After both the main module 12 and the LED display rotary knob module 14 are mounted and the wiring connected, the brake controller 10 is ready to be calibrated and used in accordance with the logic sequence of the system. The LED display provides two distinct types of information, schematically represented in FIG. 6. First, it indicates status information useful in calibration and troubleshooting the brake controller setup. Second, it indicates the value setting and setting mode when the knob 52 is moved.

Calibration and status information is communicated using the series of LEDs 56 primarily based on the color palette being displayed, with a flashing pattern/number of LEDs being lit that indicates the importance of the information. In the preferred embodiment, the calibration indicator is communicated entirely in green, inherently indicating to the user that everything is fine and calibration is a normal part of operation of the brake controller 10. Whenever power is first applied to the brake controller 10 (usually by starting the engine of the towing vehicle) and a trailer is connected, the brake controller 10 self-calibrates prior to braking operation. Calibration should be performed while parked on a level surface, with the vehicle in park or neutral with the parking brake applied, foot off of the brake pedal 46, and no manual control actuation. The preferred calibration indicator is a series of increasing from one green light at left to all ten green lights 56, occurring multiple times during the self-calibration over the time required for self-calibration. For instance, the preferred embodiment self-calibrates for about 5 seconds. During this 5 second time period, the display sequences, from one to ten green lights, seven times. The direction of the increasing number of green lights of the calibration indicator inherently indicates to the user which way to turn the dial to adjust (increase the volume of) various brake controller settings.

An overload status indicator is provided by flashing half of the LEDs 56 in one color and flashing the other half of the LEDs 56 in a second color. For instance, the preferred embodiment, when displaying the overload status indicator, flashes every other LED 56 (the first, third, fifth, seventh and ninth LED) in red, and flashes the remaining LEDs 56 in yellow. The overload status indicator indicates when the brake control is in an overload or short-circuit condition. The LEDs 56 flash red and yellow in sequence until the overload condition is removed. The flashing red and yellow does not indicate a direction of movement or otherwise suggest any movement of the dial 52. The red and yellow color and flashing inherently indicates that the overload or short circuit condition is an alarm condition that needs to be rectified to avoid potential damage to the brake controller 10 or braking system, or worse yet, to avoid a dangerous brake failure situation.

A miswired status indicator is provided by showing all ten LEDs 56 on in a particular color for an extended period of time, such as in red for in excess of 10 seconds. The miswired status is most commonly caused by having the red wire of the brake controller main module 12 connected to ground side of stoplight pedal switch or shorted to ground, or a miswired trailer connector. The red color inherently indicates that the miswired status needs to be corrected for the trailer or towed vehicle brakes to function.

A disconnect status indicator is provided by flashing LEDs 56 in a particular color, preferably not a color within the red, yellow, green palette of a common stoplight. The preferred embodiment uses blue flashing LEDs 56 as the disconnect indicator. One embodiment flashes all ten LEDs 56 in the selected color, while the embodiment depicted in FIG. 6 only flashes the first, second, ninth and tenth LEDs 56. If desired, for any of the status indicators, more information can be conveyed by the number of LEDs 56 that are flashing or by which LEDs 56 in the series are flashing. A blue display thus indicates when the trailer has been disconnected (flashing blue) or if the brakes are pressed with no trailer connected (steady on blue as long as brake pedal 46 is held). The blue color inherently indicates that the disconnect status is not an alarming condition, but that the brake controller 10 is functioning but not actively controlling the brakes of the trailer or towed vehicle.

An accelerometer error status indicator is provided by displaying a color not otherwise used, and preferably not a color within the red, yellow, green palette of a common stoplight. The preferred embodiment uses purple in a ramp pattern on the ten LEDs 56 as the accelerometer error indicator. The accelerometer error condition is most commonly rectified by unplugging the trailer connector and plugging it back in.

In inputting control information, there are four modes of operation: brightness, manual control, brake output control, and sensitivity control. Pressing the knob 52 inward (toward the dashboard) switches between these four modes. Each mode of operation occurs in a distinct color profile of the LED display, so the user can immediately determine which mode the input is in by looking at the color of the LED display. For inputting control information, the number of LEDs 56 being lit (in the preferred embodiment, generally from a minimum or zero or one to a maximum of ten) is generally indicative of the value being selected by the user for the particular setting being controlled.

The default or initial mode of operation of the control knob 52 is brightness control. In the preferred embodiment, brightness control is displayed with white colors on the series of ten LEDs 56 (actually, with illuminating all three of the additive red-green-blue LEDs on any LED chip 56 at the same time, so the output is viewed by the user as showing a white light through its window 58). While in brightness control mode, rotating the knob 52 clockwise increases the brightness or luminosity of however many white lights are showing, at the same time as it increases the number of windows 58 which are lit, from dimly lighting one window 58 to brightly lighting ten windows 58. While in brightness control mode, rotating the knob 52 counter-clockwise decreases the brightness or luminosity of however many white lights are showing, at the same time as it decreases the number of windows 58 which are lit. Based on the brightness setting selected (from one to ten), any time the LEDs 56 are lit (in any color) they will illuminate with a brightness consistent with a brightness setting. The brightness setting thus enables the user to select how brightly the display appears whenever it illuminates during driving or braking, in a way similar to the way some vehicles allow the user to select how bright or dim dash lighting should be. The brightness setting is particularly beneficial for the contrast between sunlit daytime driving, when maximum brightness may be needed to adequately notice or see the output of the LEDs 56, and dark night-time driving, when a much dimmer display is desired so as to not "blind" or otherwise overly distract the driver and so as to not overly illuminate the cab of the towing vehicle.

One beneficial aspect of the control logic is that the control knob 52 returns to the brightness control mode whenever the knob 52 has not been pressed in or rotated for a threshold period of time, in the preferred embodiment about 10 seconds. Because of this, the only way the other three modes of control operation can be reached and the brake controller settings changed is by first depressing the knob 52 and then, before the threshold time period is reached, either holding the knob 52 in or rotating the knob 52. The required input provides a beneficial safety feature that inadvertent contact with the brake controller knob 52 will only rarely result in changing any of the brake control operational settings, but instead will only adjust or change the brightness of the LEDs 56 in the display.

Depressing the control knob 52 and holding it in for a period of time (such as in excess of 0.5 seconds) changes the input to manual brake output control. In the preferred embodiment, manual brake output control is displayed with entirely red colors on the series of LEDs 56. Manual brake activation is typically used by a driver in situations where a slow reduction in speed is desirable. In manual brake output control mode, the brake controller 10 begins to apply the trailer or towed vehicle brakes, increasing braking pressure by ramping over time. The red LEDs 56 light up in sequence, with the number of LEDs 56 being lit being proportional to how long the knob 52 has been held in during the ramp-up and simultaneously proportional to the brake output. The maximum output of the manual brake output control is adjustable by, while the knob 52 is being pushed down, rotating the knob 52 clockwise to increase the maximum manual brake output and rotating the knob 52 counter-clockwise to decrease the maximum manual brake output.

From the default or brightness control mode, depressing the control knob 52 and releasing it changes the input to brake output control. The brake output control determines how hard to apply the trailer brakes for a given accelerometer reading when the brake pedal 46 of the towing vehicle is being pushed. The output control also generally establishes the maximum amount of power available to the trailer brakes when braking. The output control is most commonly adjusted during initial setup, when trailer load changes, when different trailers are used or when adjustment is needed for changing road or driving conditions. In the preferred embodiment, brake output control is displayed with green colors on the left side of the series of ten LEDs 56 shifting toward red colors on the right side of the series of ten LEDs 56. While in brake output control mode, rotating the knob 52 clockwise increases the braking output and the number of windows 58 which are lit, and rotating the knob 52 counter-clockwise decreases the braking output and the number of windows 58 which are lit. After 10 seconds of no user input, the interface reverts to brightness mode and the display goes to sleep.

From the default or brightness control mode, depressing the control knob 52 and releasing it twice changes the input to sensitivity control. The sensitivity control adjusts trailer brake aggressiveness. Sensitivity adjustment has no effect on the manual control. The sensitivity control can be adjusted for individual driver preference, trailer load changes or changing road conditions. In the preferred embodiment, sensitivity control is displayed with blue colors on the left side of the series of ten LEDs 56 shifting toward red colors on the right side of the series of ten LEDs 56. While in sensitivity control mode, rotating the knob 52 clockwise increases the sensitivity and the number of windows 58 which are lit, and rotating the knob 52 counter-clockwise decreases the sensitivity and the number of windows 58 which are lit, After 10 seconds of no user input, the interface reverts to brightness mode and the display goes to sleep.

As described above, all of the primary operational controls of the brake controller 10 are operated by manipulation of a single input dial 52. However, the preferred embodiment includes switch controls 76, 78 on the main module 12 which are intended to never be used when driving the towing vehicle or adjusting the brakes, but rather to change the control logic within the main module 12 particularly for the manual output mode. Specifically, there are two small switches 76, 78 located at the front of the unit, next to the port 74 on the main module 12 and shown in FIG. 1. Once accessed, the switch positions can be changed using a small pointed tool (not shown), but are quite difficult or impossible to change by hand.

The switch 76 on the right controls the level of output available to the trailer brakes when using the manual control. The factory default setting is the 'ON' position with the switch 76 down. This setting limits the manual control output to the level set using the output control mode. As noted previously, the output control mode generally establishes the maximum amount of power available to the trailer brakes when braking. The only exception is when the manual control is set up for 100% braking. Moving this switch 76 up to the 'OFF' position allows 100% of the output to the brakes when the manual control is actuated regardless of the output control setting.

The switch 78 on the left controls the unit's brake light activation feature. The factory default setting is the 'ON' position with the switch 78 is down. This setting activates the tow vehicle and trailer brake lights when the manual control is actuated. Some tow vehicle circuits do not allow power for brake lights from a second source. In these applications, the brake light feature can be switched off using this second small switch 78 at the rear of the unit 12. The brake light connection (red wire 38) is still required to activate the brake controller 10 with the switch 78 in either position. Moving the switch 78 up to the 'OFF' position turns off the brake light activation feature and the brake lights are not activated when the manual control is actuated.

Like the preferred embodiment of the present invention, prior art brake controllers included a control input for determining the maximum output of the trailer brakes, a separate control input for determining the aggressiveness of the trailer brakes, and a separate control input for manual operation of the trailer brakes. However, the four modes of operation (the fourth mode being control of the brightness of the ten LEDs 56, for better viewing in the light conditions present at the time in the cab of the towing vehicle), all controlled by the single continuous rotation dial 52 and as explained above, are entirely new and different. The series of full color LEDs 56 are used in gradations to intuitively represent the various operational settings of the brake controller 10, while providing direct feedback to the dial input rather than the confusing feedback of the prior art displays.

Figure 7:
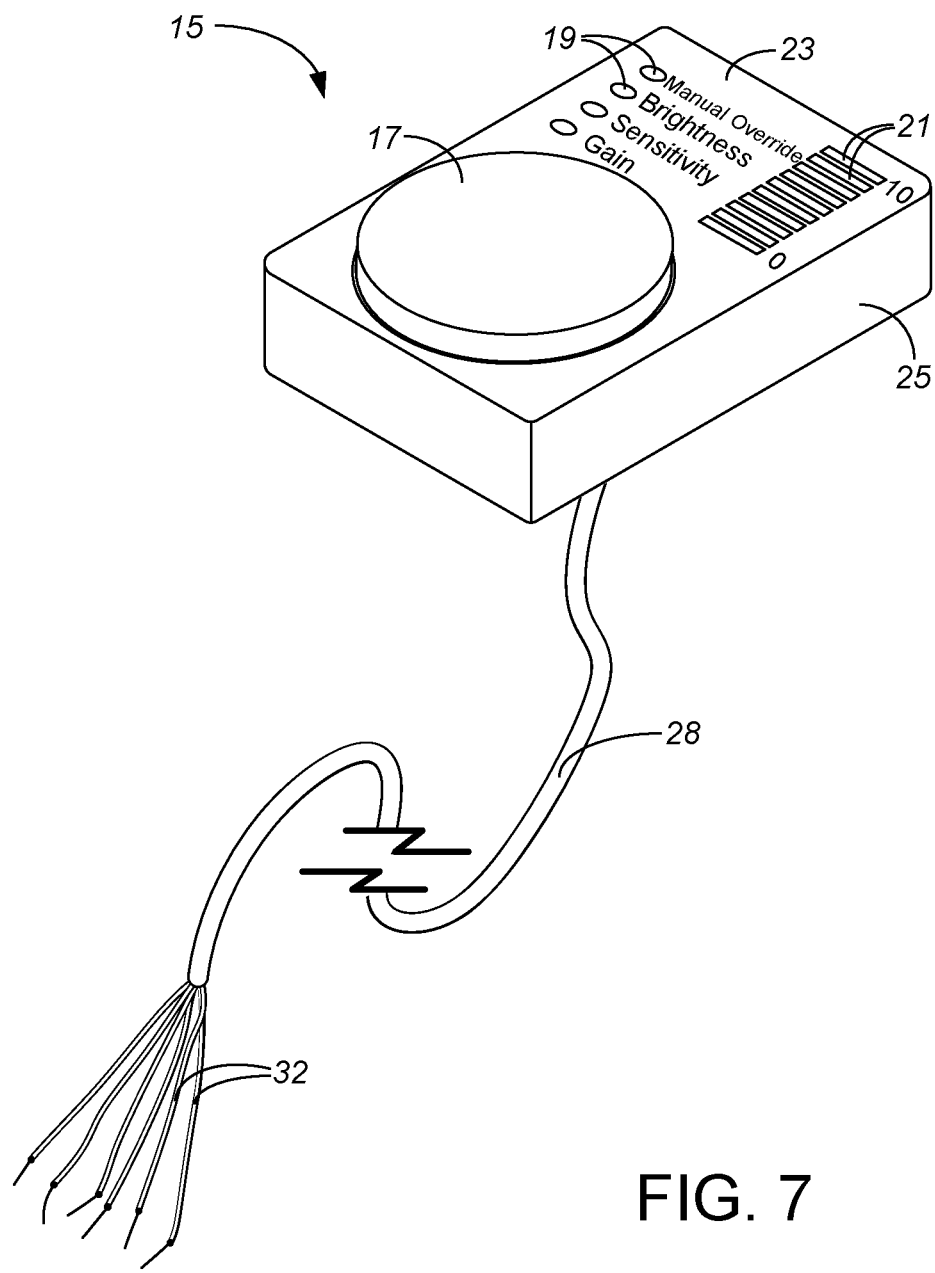
FIG. 7 is a perspective view of an alternative interface module.
Figure 8:
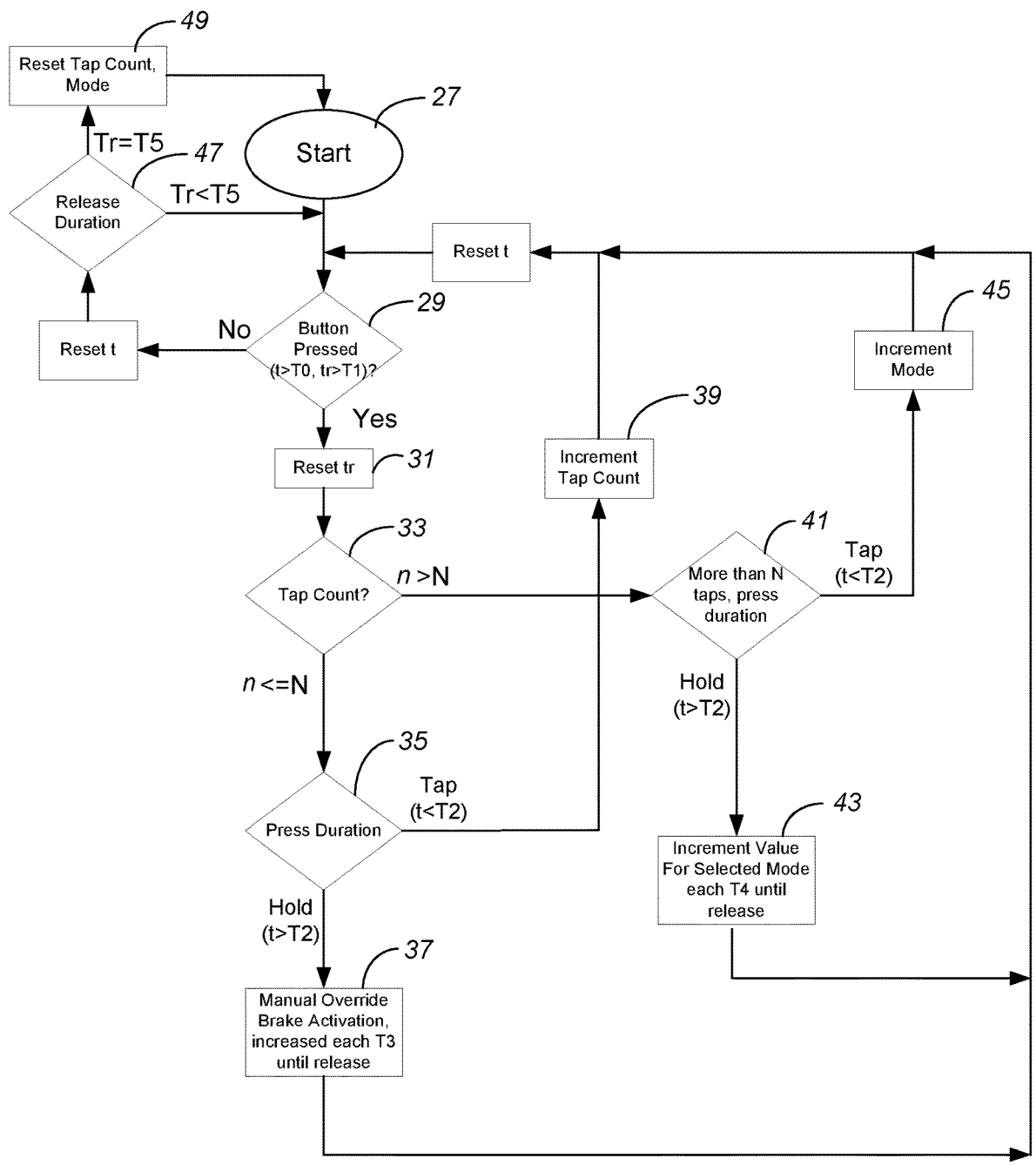
FIG. 8 is a flow chart indicating the preferred logic used with the alternative interface module of FIG. 7.

FIGS. 7 and 8 represent a lower cost version using the display/push button module 15 in place of the display/knob module 14. The display/push button module 15 includes a push button 17 which is a simple normally open switch, available at a lower cost than the encoder 54. For instance, the push button 17 can be similar in size and shape to the ignition button used on many current vehicles, such as within a range of 1 to 2 inches (25-50 mm) in diameter, pushed a distance of about $\frac{1}{10}^{th}$ of an inch (2-3 mm) or less to close the switch.

If desired, the push button 17 could be used with the series of multi-color LEDs 56 described previously, with the push button 17 replacing the rotary encoder 54. More preferably for a lower cost version, the display/push button module 15 includes two series 19, 21 of single color LEDs. Series 19 of LEDs indicates the mode for data being input into the brake controller, which in the preferred embodiment includes four modes of Manual Override, Brightness, Sensitivity and Gain, performing the functions of brightness, manual control, brightness, sensitivity and brake output control described previously for the display/knob module 14. Labels or indicia 23 may be printed on the exposed surface of the housing 25, so the driver understands which mode is being used. Series 21 of LEDs indicates the current value for data being input in that mode. The preferred display/push button module 15 includes ten LEDs in series 21, similar (but without color) to the ten full color LEDs 56 described previously for the display/knob module 14. The fourteen total LEDs in series 19 and 21 can usually be obtained at a lower cost than ten full color LEDs 56. The display/push button module 15 is normally mounted in the dash of the towing vehicle with the series 19 and 21 of LEDs above the push button 17, allowing for a better line of sight and unobstructed viewing by the driver without interference by the driver's hand as the driver pushes the button 17. Mounting options for the display/push button module 15 are similar to the mounting options for display/knob button 14 discussed previously. Alternatively, the two series 19 and 21 of single color LEDs could be used with the rotary encoder 54.

The logical operation of pushing the push button 17 is described with reference to the flow chart of FIG. 8. In general terms, the logic defines "taps" and "holds" of the push button 17 based on the duration that the button is held down, with "taps" functioning similar to pressing in the knob 54 and "holds" functioning similar to slowly rotating the knob 54 clockwise, but with several adjustments made to increase the safety and functionality of the system.

From a start block 27, the logic first determines whether the button 17 is intentionally pressed 29, using a timer t which begins counting when the switch is closed. Similar to the 4 ms at make and 10 ms at break debounce of the encoder 54, the logic includes a debouncing or noise eliminating feature to ensure accurate reading of when the button is intentionally pressed or intentionally released. However, the durations for make and break debouncing are intentionally longer than those for pressing of the encoder 54. For instance, the "Yes" determination that the button has been intentionally pressed may not be made until after a timer t, which increases each millisecond the switch 17 is closed, shows that the button 17 has been pressed for a value in excess of T0, in the preferred embodiment for 10 ms. The "No" determination that the button 17 has been intentionally released may not be made until after a second timer tr, which increases each millisecond the switch 17 is open, shows that the button 17 has been released for a value in excess of T1, in the preferred embodiment for 50 ms. While the timers t and tr could be provided on a microcontroller chip (not shown) within the housing 25, more preferably they are included within the primary microcontroller chip (not separately shown) of the main module 12. Any noise in the lines 32 will simply increment the opposite timer, but not enough to reach either t=T0 (for make) or tr=T1 (for break) opposite of what the user intends. Each time block 29 determines that the button 17 has been intentionally pressed, the release timer tr is reset 31 to zero. In other words, the "Yes" determination will be made any time the switch 17 has been closed for ten milliseconds within a maximum of sixty milliseconds polling period.

If a "Yes" determination 29 is made that the button 17 has been pressed, the next step 33 is based on a tap count n, which starts at zero. Assuming a tap count n less than or equal to a selected value N, the press duration is assessed 35 (i.e., t compared to a value T2) to determine whether this is a tapping of the button 17 or a holding of the button 17. In the preferred embodiment, T2 is 200 ms, that is, a hold event is any time timer t indicates the button 17 is held down for at least 200 ms without hitting at least 50 ms of open time on release timer tr, whereas a tap event is any time t the button 17 is released for 50 ms of open time on the release timer tr before hitting 200 ms of closed time on the timer t.

At a low tap count (n<N), if a hold event is detected at block 35, the main module 12 activates the manual override brake function 37, which additionally includes lighting the top LED labeled "Manual Override" in series 19. The ten LEDs 21 are sequentially lit as a function of hold time, increasing the manual braking force by 10% increments (and lighting one more of the LEDs in series 21) as the button 17 is held down for additional T3 durations. For instance, in the preferred embodiment T3 is 500 ms, so full braking in manual override occurs if the button 17 has been held down for 5 seconds without being open for 50 ms.

At a low tap count (n<N), if a tap event is detected at block 35, then the tap count n is increased 39 by plus one, returning to look for the next hold or tap event. In the preferred embodiment N is selected at 2. Thus, if the user performs a single tap followed by a hold, the manual override brake function 37 will be activated. Similarly, if the user performs two taps followed by a hold, the manual override brake function 37 will be activated. Only if the user performs at least N+1 (three) taps of the button 17 can the other modes be activated for selecting brake controller settings.

When the user performs N+1 (three) taps of the button 17 and again presses the button 17 (i.e., the N+2 pressing), the Brightness mode is entered, the second LED in series 19 labeled "Brightness" is lit, and the current brightness value (as stored in the microprocessor of the main module 12) is displayed by lighting the corresponding number of LEDs in series 21. The press duration of the N+2 pressing is assessed at step 41. The user now holding the button 17 down for durations of T4 or more will incrementally increase the brightness value of the LEDs 19, 21 at step 43. In the preferred embodiment T4 is 500 ms, e.g., holding the button 17 down for two seconds will increase the brightness value plus four. When the brightness value hits the maximum (in the preferred embodiment, ten of ten), continuing to hold the button 17 down for another T4 (500 ms) will revert the brightness to a zero (dimmest) value. Conversely, if the N+2 pressing is determined to be a tap, the mode is incremented at step 45.

When the user performs N+2 (four) taps of the button 17 and again presses the button 17 (i.e., the N+3 pressing), the Sensitivity mode is entered, the third LED in series 19 labeled "Sensitivity" is lit, the second LED in series 19 labeled "Brightness" is unlit, and the current brightness value (as stored in the microprocessor of the main module 12) is displayed by lighting the corresponding number of LEDs in series 21. When in the Sensitivity Mode, holding the button 17 down for additional T4 durations sequentially increases the sensitivity setting at step 43.

When the user performs N+3 (five) taps of the button 17 and again presses the button 17 (i.e., the N+4 pressing), the brake output control mode is entered, the fourth LED in series 19 labeled "Gain" is lit while the third LED in series 19 labeled "Sensitivity" is unlit, and the current brake output control value (as stored in the microprocessor of the main module 12) is displayed by lighting the corresponding number of LEDs in series 21. When in the brake output control Mode, holding the button 17 down for additional T4 durations sequentially increases the gain setting at step 43.

If the user continues to tap the button 17, the logic will increment the mode at step 45 and cycle again through Manual Override mode (after six, ten, fourteen, etc. taps), Brightness mode (after seven, eleven, fifteen, etc. taps), Sensitivity mode (after eight, twelve, sixteen, etc. taps), and brake output control mode (after nine, thirteen, seventeen, etc. taps).

If the user releases the button 17 for a sufficient duration at step 47 that the release timer tr hits a time out or release duration T5, the entire logic will reset at step 49, and return to Start 27. For instance, the preferred embodiment uses a T5 release duration of 2 seconds to time out the system. All of the LEDs in series 19, 21 are preferably unlit when the time out release duration T5 has been reached at step 47.

The purpose for having the tap count step 33 and having a value N greater than zero is to provide a safety feature to the system. Ordinarily, users adjusting Brightness, Sensitivity or Gain are doing so thoughtfully, deliberately and slowly. In contrast, users sometimes need to activate the manual override quickly, while they are somewhat flustered and while driving in what they perceive to be a dangerous situation. If the user, in somewhat of a panic, happens to tap the button 17 once or twice while trying to activate the manual override, the logic still stays in the Manual Override Mode. Only when the user first enters multiple taps can the other brake controller settings be adjusted.

If desired, warning signals and error codes can be provided to the display/push button module 15 similar to those previously described for the display/knob module 14, but conveying information by flashing patterns of the LEDs 19, 21 rather than either by color or by combination of color and flashing.

While the logic and operation of the display/push button module 15 is considered more complicated and less intuitive than the display/knob module 14, for some users the reduction in cost may be worth the trade off. Both options take up little of the valuable dashboard real estate, while providing a sophisticated and multi-functional brake controller interface.

Although the present invention has been described with reference to preferred embodiments, workers skilled in the art will recognize that changes may be made in form and detail without departing from the spirit and scope of the invention.

The invention claimed is:

1. A brake controller comprising:
a micro-processor based control module having a plurality of settings which control functions of the brake controller output for use in controlling brakes of a trailer or towed vehicle, each of the plurality of settings having a range of values any value of which can be selected by a user; and
an input element having control motion which is hand operable by a single hand of the user, in communication with the micro-processor based control module, the input element, depending upon a control motion sequence used, being both able to a) switch between input modes, with different input modes controlling different settings of the brake controller, with at least a first of the input modes for adjusting gain of the brake controller and at least a second of the input modes for adjusting a different setting without changing gain of the brake controller; and b) allow user selection of a value for the setting being controlled in that input mode;
wherein the input element is the only user-movable part of the brake controller for controlling settings of the brake controller.

2. The brake controller of claim 1, wherein the input is on an input module which is separately mounted relative to the micro-processor based control module.

3. The brake controller of claim 1, wherein the input element is a rotary dial, wherein pressing the rotary dial switches between input modes, and wherein turning of the rotary dial allows users selection of the value for the setting being controlled in that input mode.

4. A brake controller comprising:
a micro-processor based control module having a plurality of settings which control functions of the brake controller output for use in controlling brakes of a trailer or towed vehicle, each of the plurality of settings having a range of values any value of which can be selected by a user; and
an input element having control motion which is hand operable by a single hand of the user, in communication with the micro-processor based control module, the input element, depending upon a control motion sequence used, being both able to a) switch between input modes, with different input modes controlling different settings of the brake controller; and b) allow user selection of a value for the setting being controlled in that input mode;
wherein the input element is the only user-movable part of the brake controller for controlling settings of the brake controller,
wherein the input element is a push button, and comprising a timer for determining how long the push button has been pushed, wherein pushing the push button for a duration less than a threshold value is considered a tap event and pushing the push button for a duration greater than the threshold value is consider a hold event, and wherein tap events are used to switch between input modes and hold events are used for user selection of the value for the setting being controlled in that input mode.

5. The brake controller of claim 4, wherein one of the input modes is manual brake output control accessed by depressing the push button and holding it in to increase braking pressure by ramping over time.

6. The brake controller of claim 1, wherein the first of the input modes is brake output control adjusting gain of the brake controller, and the second of the input modes is sensitivity control without changing gain of the brake controller, and wherein the input element is the only part of the brake controller moved by the user to select values for brake output control and values for sensitivity control.

7. A brake controller comprising:
a micro-processor based control module having a plurality of settings which control functions of the brake controller output for use in controlling brakes of a trailer or towed vehicle, each of the plurality of settings having a range of values any value of which can be selected by a user; and
an input element having control motion which is hand operable by a single hand of the user, in communication with the micro-processor based control module, the input element, depending upon a control motion sequence used, being both able to a) switch between input modes, with different input modes controlling different settings of the brake controller; and b) allow user selection of a value for the setting being controlled in that input mode;
wherein the input element is the only user-movable part of the brake controller for controlling settings of the brake controller,
wherein one of the input modes is brightness control over a display of the brake controller.

8. A brake controller comprising:
a micro-processor based control module having a plurality of settings which control functions of the brake controller output for use in controlling brakes of a trailer or towed vehicle;
an input in communication with the micro-processor based control module, which enables control of at least some of the settings of the brake controller; and
a display comprising:
a) a plurality of light elements in a first sequence, wherein lighting of any one of the light elements in the first sequence indicates an input mode for the brake controller; and
b) a plurality of light elements in a second sequence, with sequential lighting of the light elements in the second sequence indicating a value for the setting being controllable by the input while in that input mode.

9. The brake controller of claim 8, wherein the input is based on motion of a hand operated control element, and wherein the plurality of light elements are disposed relative to the hand operated control element to be lit in correspondence with motion of the hand operated control element.

10. The brake controller of claim 8, wherein one of the input modes is brightness, and wherein the setting being controllable by the input is brightness of the light elements.

11. A method of inputting settings into a brake controller, comprising:
moving a hand operated control element to input a value for a first setting;
changing input mode of the hand operated control element; and
moving the hand operated control element to input a value for a second setting;
wherein the value for one of the first and second settings can be changed without changing gain of the brake controller, and wherein changing the value for the other of the first and second settings changes gain of the brake controller.

12. The method of claim 11, wherein the first setting is display brightness, and wherein, after a period of time elapses since the last setting change, the input mode reverts to brightness control mode.

13. The method of claim 11, wherein the first setting is a manual brake control output setting, with manual brake control outputting a braking pressure signal which begins at an initial value and thereafter ramps up over time, with the manual brake control output setting determining a maximum value of the braking pressure signal, and wherein, after a period of time elapses since the last setting change, the input mode reverts to manual brake control mode.

14. The method of claim 11, wherein changing input mode of the hand operated control element comprises tapping the hand operated control element for a duration less than a threshold value.

15. The method of claim 14, wherein multiple consecutive tappings are required to change input mode.

16. The method of claim 14, wherein inputting a value for the first setting comprises holding the hand operated control element for a duration greater than a threshold value.

17. A method of inputting settings into a brake controller, comprising:
moving a hand operated control element to input a value for a first setting;
changing input mode of the hand operated control element; and
moving the hand operated control element to input a value for a second setting,
wherein the brake controller includes four different input modes including
a) manual brake control;
b) brightness of lighting elements in a display;
c) braking sensitivity; and d) gain to adjust brake output based on accelerometer output combined with the gain value.

18. The method of claim 17, wherein the brake controller includes four lights in a display, each light being associated with one of the four different input modes, and further comprising lighting the light associated with the currently active input mode.

19. The method of claim 18, further comprising:
lighting a plurality of light elements of the brake controller in a sequence about the hand operated control element, with sequential lighting of the light elements indicating a value for the setting being controllable by the hand operated control element in the currently active input mode.

* * * * *